Figure 1:
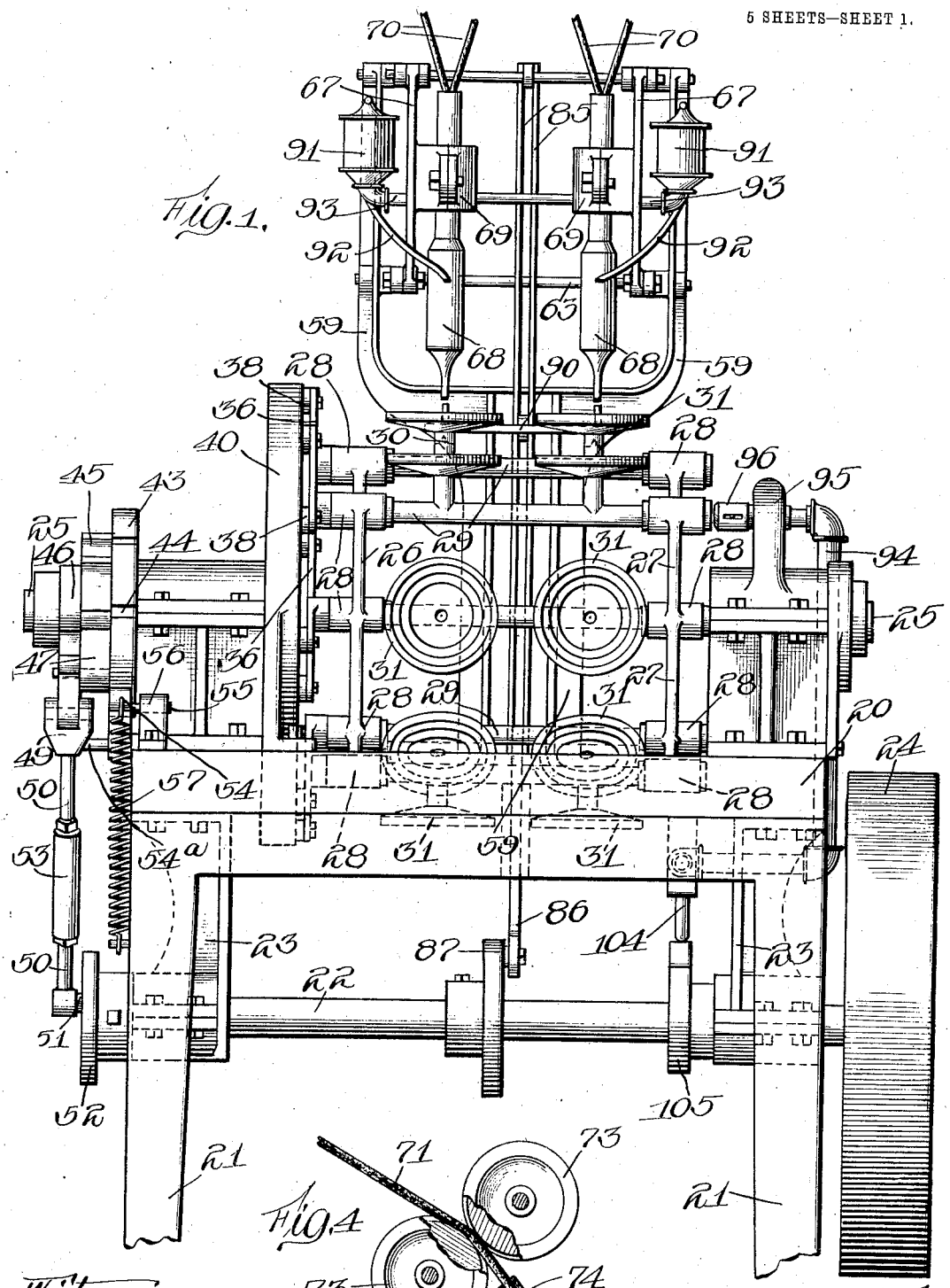

No. 842,187. PATENTED JAN. 29, 1907.
H. EACHUS.
MACHINE FOR APPLYING SOLDER TO CAN TOPS.
APPLICATION FILED JULY 5, 1906.

5 SHEETS—SHEET 1.

No. 842,187. PATENTED JAN. 29, 1907.
H. EACHUS.
MACHINE FOR APPLYING SOLDER TO CAN TOPS.
APPLICATION FILED JULY 5, 1906.

5 SHEETS—SHEET 2.

Witnesses:
Inventor:
Holton Eachus
by Bond, Adams, Pickard & Jackson
Attys

No. 842,187. PATENTED JAN. 29, 1907.
H. EACHUS.
MACHINE FOR APPLYING SOLDER TO CAN TOPS.
APPLICATION FILED JULY 5, 1906.

5 SHEETS—SHEET 3.

Witnesses:

Inventor:
Holton Eachus
by Bond, Adams, Pickard & Jackson
Attys

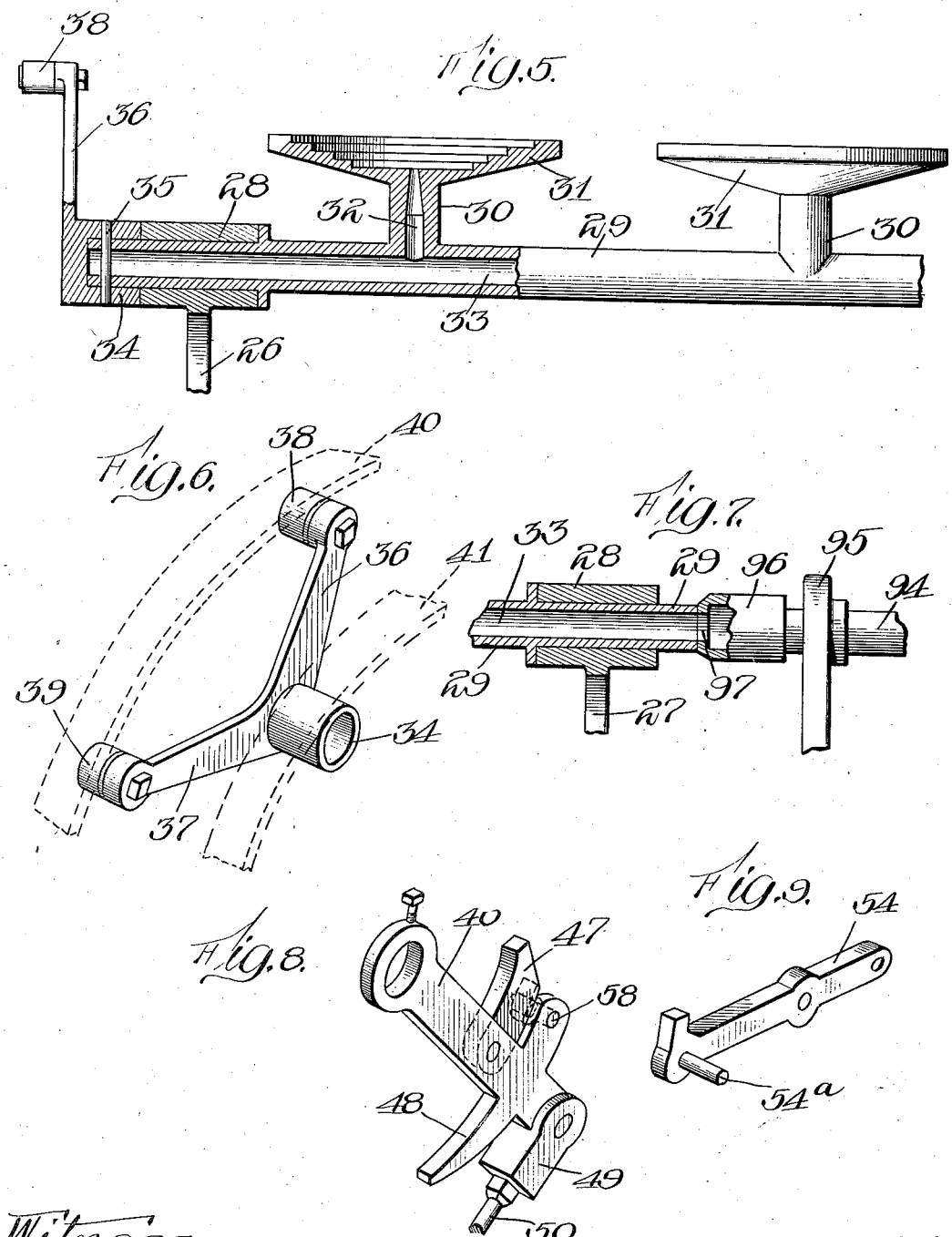

No. 842,187. PATENTED JAN. 29, 1907.
H. EACHUS.
MACHINE FOR APPLYING SOLDER TO CAN TOPS.
APPLICATION FILED JULY 5, 1906.
5 SHEETS—SHEET 5.
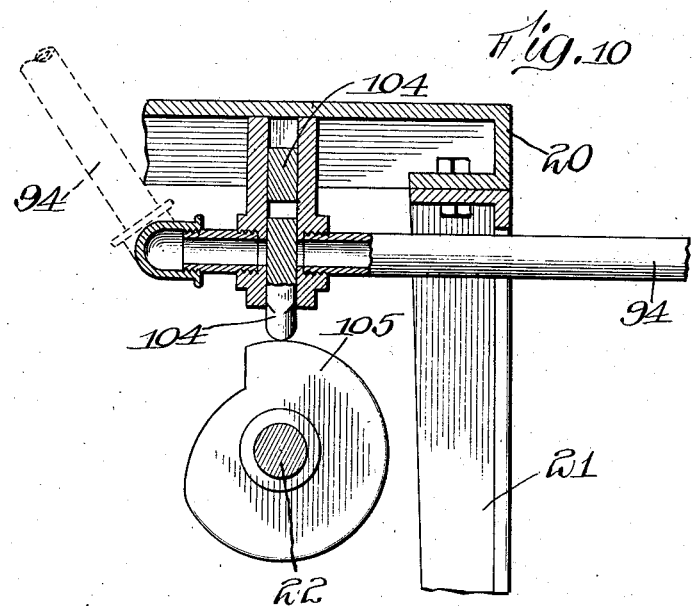
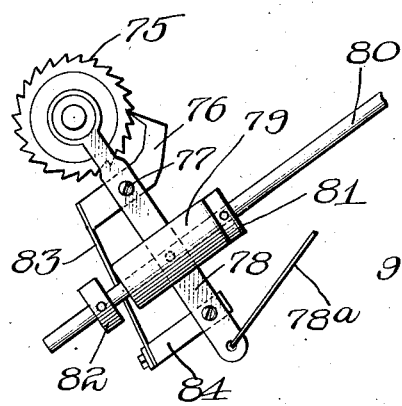
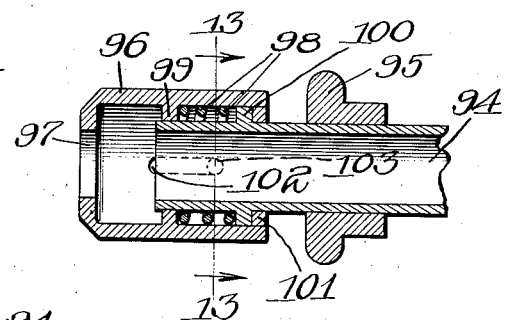
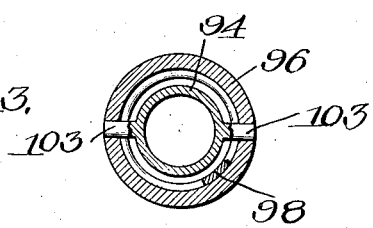
Witnesses:
Inventor:

UNITED STATES PATENT OFFICE.

HOLTON EACHUS, OF CHICAGO, ILLINOIS, ASSIGNOR TO FAIRBANK CANNING COMPANY, OF CHICAGO, ILLINOIS, A CORPORATION OF ILLINOIS.

MACHINE FOR APPLYING SOLDER TO CAN-TOPS.

No. 842,187.      Specification of Letters Patent.      Patented Jan. 29, 1907.

Application filed July 5, 1906. Serial No. 324,798.

*To all whom it may concern:*

Be it known that I, HOLTON EACHUS, a citizen of the United States, residing at Chicago, county of Cook, State of Illinois, have invented certain new and useful Improvements in Machines for Applying Solder to Can-Tops, of which the following is a specification, reference being had to the accompanying drawings.

This invention relates to a machine for applying and affixing a single drop of solder to a can-top in close proximity to the small vent-hole that is made in such can-top to permit of the escape of air and gases from the can to which the top is applied. It has been customary in sealing such vent-hole to drop upon the can-top a number of loose pieces of solder and while the can with the cooked or processed articles therein was in a vacuum to seal up such vent-hole by a suitable soldering-iron, using in this soldering operation usually only one of the drops of solder placed on the can-cover. This necessarily has resulted in a large waste of solder; and it is the object of my present invention to provide a machine that will accurately deposit on a can-top and affix thereto a single drop of solder, such solder being affixed in close proximity to said vent-hole, so that when the can to which the cover is affixed is in a vacuum this drop of solder may by the use of a suitable soldering-iron be spread over and seal up this vent-hole.

It is the further object of my invention to provide a machine wherein drops of solder may be so affixed to a plurality of can-tops at the same time.

Furthermore, by my invention I provide means for so operating upon a large number of can-tops successively and also provide means for keeping the solder from closing the vent-holes as the can-tops have such drops of solder applied to them.

I accomplish the objects of my invention by the means and combinations of devices hereinafter described, and illustrated in the accompanying drawings.

Figure 2:
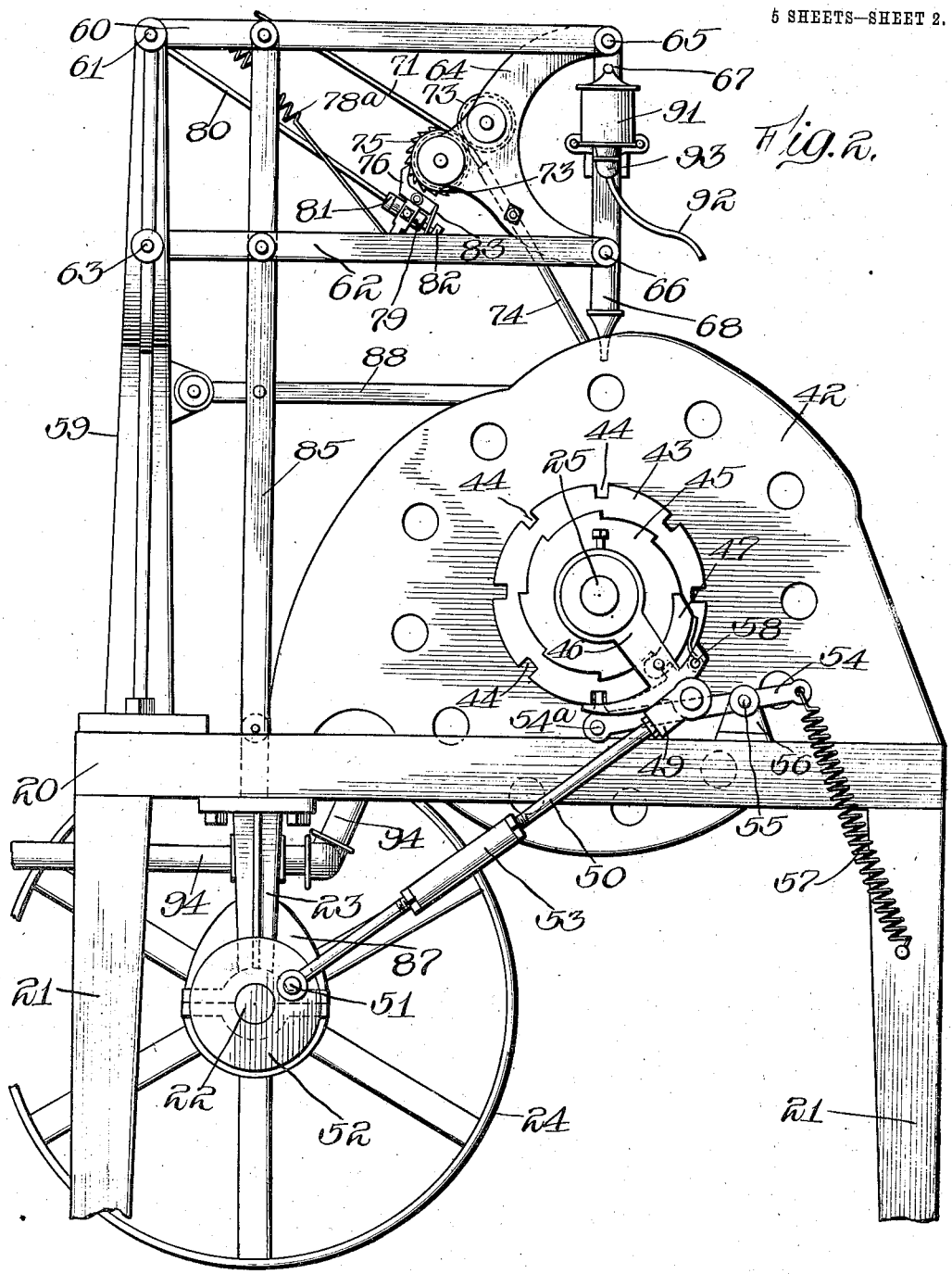
Figure 3:
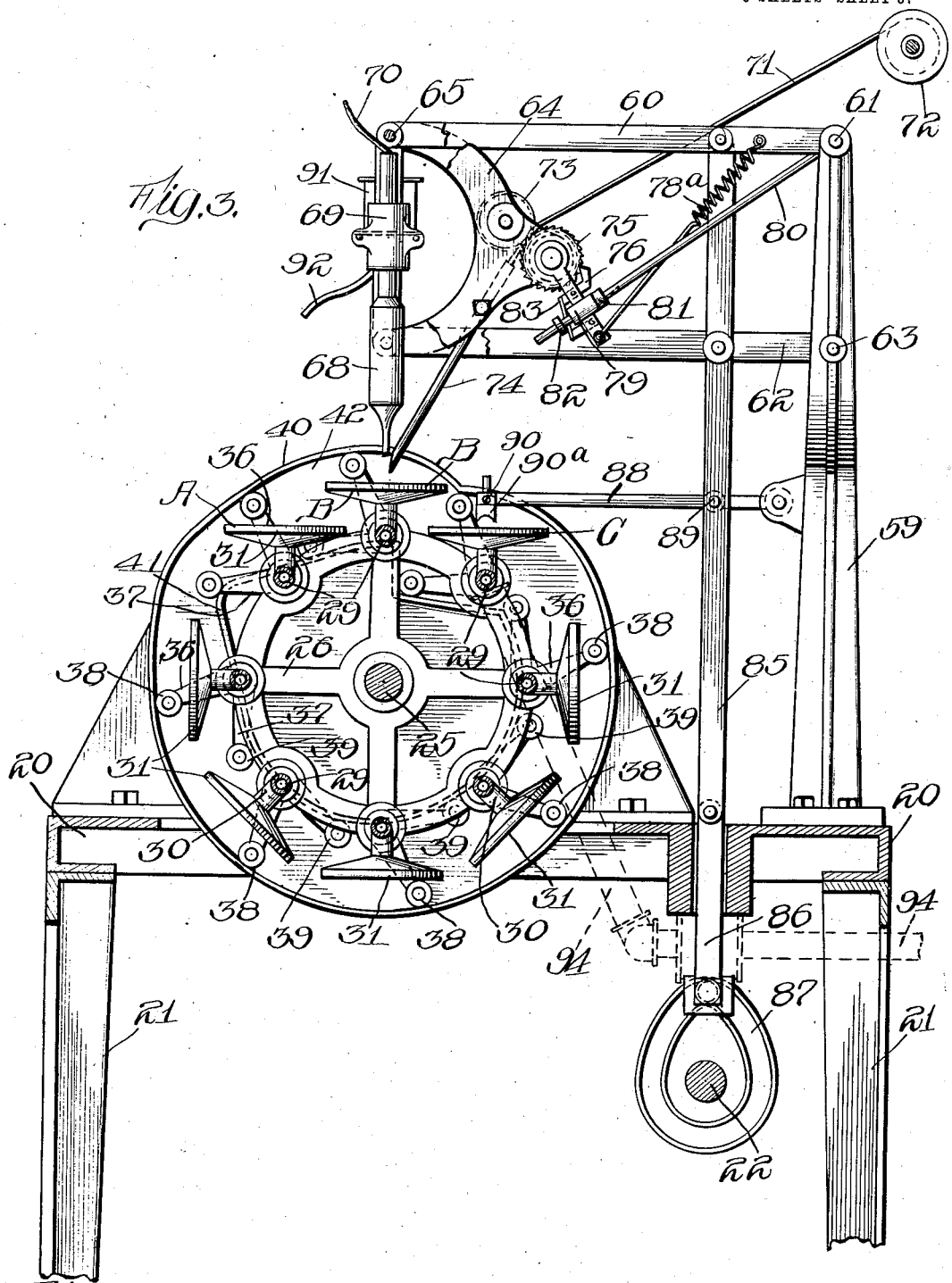

In the accompanying drawings, Figure 1 is a front elevation. Fig. 2 is a side elevation. Fig. 3 is a vertical central section. Fig. 4 is a detail, being a view of one of the pairs of rolls for feeding a strip of solder forward and downward, showing also such strip of solder and the guiding-tube through which it passes. Fig. 5 is a detail, partly in section, of one of the hollow shafts upon which the can-top supports are carried, showing also the connection at one end of such shaft, through which the shaft is given an independent axial movement. Fig. 6 is a detail, being a perspective view of the two-armed connection at one end of each hollow shaft, showing also in dotted lines the cam-tracks which are engaged by such two arms. Fig. 7 is a detail, partly in section, of one of the hollow shafts and the connection that automatically establishes communication from time to time with a compressed-air device. Fig. 8 is a detail, being a perspective view of a part of the mechanism employed for intermittently rotating the devices that carry the can-tops. Fig. 9 is a detail, being a perspective view of a lever for locking the can-carrying device in place while drops of solder are being applied to the can-tops. Fig. 10 is a detail in section of the valve mechanism for regulating the flow of compressed air to the hollow shafts that carry the can-top supports. Fig. 11 is a detail, being a side elevation of the means employed for feeding forward the strip of solder. Fig. 12 is a detail, being a sectional view of the spring-actuated connection between the compressed-air pipe and one of the hollow shafts that carry the can-top supports. Fig. 13 is a detail, being a cross-section at line 13 13 of Fig. 12.

Referring to the several figures of the drawings, in which corresponding parts are indicated by like reference characters, 20 indicates the main supporting-frame, and 21 the legs or standards upon which the frame rests.

22 indicates the main driving-shaft, which in the construction shown is journaled in suitable brackets 23, depending from the lower face of the main frame 20.

24 indicates a driving-pulley on the end of the shaft 22.

25 indicates a shaft located over the main frame 20 and extending transversely of the machine, upon which shaft are secured two wheels 26 and 27, such wheels being located a considerable distance apart and at opposite sides of the longitudinal center of the shaft 25. The rims of these wheels are provided at regular intervals with sleeves 28, in which are journaled hollow shafts 29, from each of which project one or more studs 30, upon each of which studs is formed or has suitably secured thereto a can-top support 31. The machine is shown as designed to act upon two can-tops simultaneously, and therefore each of these hollow shafts 29 is shown as provided with two can-top supports; but it will be understood that any desired number of such supports may be provided for each shaft, according to the number of can-tops that it is designed to operate upon at the same time.

As clearly shown in Fig. 5, each stud 30 is provided with a passage 32, extending therethrough, such passage communicating with the passage 33 in its shaft 29. The object of these passages 33 and 32 is to allow of the admission of air under pressure, so as to insure the vent-holes in the can-tops remaining open after the solder has been applied to the can-tops, all as hereinafter more fully described. As clearly shown in Fig. 5, each can-top support 31 is provided in its upper face with a series of annular recesses, so as to accommodate can-tops of various sizes.

Each one of the hollow shafts 29 is closed at one end by a cap 34, that is secured to the shaft by any suitable means—as, for example, as shown in Fig. 5, by a pin 35 passing through such cap and its hollow shaft. Formed with this cap in the construction shown are two arms 36 and 37, which stand at an angle to each other, each arm having journaled to its outer face an antifriction-roller, indicated, respectively, by 38 and 39, (see Fig. 6,) which rollers bear, respectively, on cam-tracks 40 and 41.

42 indicates a plate supported by the main frame and located opposite the wheel 26, and the cam-tracks 40 and 41 are formed with or secured to this plate 42, the cam-track 40 being formed by an inwardly-directed flange at the edge of such plate, while the cam-track 41 lies below this flange, as clearly shown by dotted and full lines in Fig. 3, such cam-track 41 projecting from the inner face of said plate 42.

Referring now to the means by which the wheels 26 and 27, with their attached hollow shafts and can-top supports, are intermittently rotated and locked in position, 43 indicates a disk provided with a number of notches 44 in its edge arranged at regular intervals apart. This disk is secured on the projecting end of the shaft 25, upon which shaft the wheels 26 and 27 are mounted.

45 indicates a ratchet-wheel also secured upon the projecting end of the shaft 25 and adjacent to the notched disk 43. (See Figs. 1 and 2.)

46 indicates an arm lying against the outer face of the ratchet-wheel 45, such arm being journaled upon said projecting end of the shaft 25.

47 indicates a pawl pivoted to the arm 46 and adapted at its free end to engage the teeth on the edge of the wheel 45.

48 indicates a curved projection formed with the arm 46 and, as clearly shown in Fig. 8, projecting at each side of such arm. This curved projection is wedge-shaped, being wider at its forward end than at its rear end.

49 indicates a block the ears on the forward end of which embrace the lower end of the arm 46, said block and arm being secured together by a suitable pivot.

50 indicates a rod connected at its upper and forward end with the block 49 and at its other end to a crank 51 on the disk 52, that is fast on one end of the main driving-shaft 22. The rod 50 is preferably provided with a turnbuckle 53, as shown, for purposes of adjustment.

54 indicates a lever pivoted at 55 in a suitable bracket 56, mounted on one of the side bars of the main frame 20. This lever 54 at its free end is provided with a projection adapted to enter the notches 44 in the disk 43, and on its outer face at said free end projects a pin 54$^a$, upon which the lower edge of the curved projecting piece 48 is adapted to bear when the arm 46 is drawn back.

57 indicates a coiled spring attached to the lever 54 and to one of the standards 21 and acts to normally hold the said projection at the free end of the lever in engagement with the notched disk 43.

58 indicates a pin carried at the forward end of the curved projection 48 on the arm 46, said pin supporting a small spring that bears against the pawl 47.

With the parts as shown in Fig. 2 upon the turning of the main drive-shaft 22 it is evident that by reason of the connection of the rod 50 to the crank 51 such rod will be drawn back and will pull back the arm 46, that is loosely mounted upon the shaft 25, and such movement of said rod and arm will of course draw back the pawl 47 to cause its free end to engage the next succeeding tooth in the wheel 45. After this backward movement of the rod 50 and arm 46 has continued to nearly its limit it is evident that the curved projection 48 will strike the laterally-projecting pin 54$^a$, and thereby cause the projection on such arm to become disengaged from the notch that it is then in in the disk 43. At about the time of the disengagement of such projection from the disk 43 the pawl 47 drops behind the next succeeding tooth of the wheel 45, and the continued rotation of the crank 51 forces the rod 50 forward and necessarily causes the turning of the shaft 25 and the parts attached thereto. Shortly after the beginning of this stroke of the rod 50 the pressure of the curved projection 48 on the pin 54$^a$, carried by the lever 54, is released, and through the coiled spring 57 the next notch 44 in the disk 43 is engaged by such lever 54 and the shaft 25 and parts attached thereto held temporarily immovable. By thus intermittently moving and stopping the shaft 25 the wheels 26 and 27, which carry the hollow shafts 29, upon which the can-top supports 31 are mounted, as just hereinbefore explained, will be turned and stopped, so that the three highest sets of such can-top supports will be stopped in proper position to allow can-tops to be placed in position by an attendant on one set of such can-top supports, while on another of such sets drops of solder will be applied to can-tops by the means hereinafter described, and a blast of air will be blown through the vent-holes in the can-tops on still another such set of supports, so as to remove from such vent-holes any of the partially-hardened solder that may have closed them.

In Fig. 3 I have indicated by A, B, and C these sets of can-top supports in the positions mentioned, respectively. It will be noted that the antifriction-rollers 38 and 39 on the ends of the arms 36 and 37, respectively, bear constantly upon the cam-tracks 40 and 41, respectively, and that by reason of the shape of these cam-tracks the three sets of can-top supports that are uppermost will be held horizontal in order that the several operations of placing such can-tops on one set of supports, dropping the solder on the can-tops upon the highest set of can-top supports, and opening the vent-holes in the can-tops on a third set can be properly performed. It is deemed unnecessary to describe in detail the outline of these cam-tracks that enable the three uppermost sets of can-top supports to remain horizontal, as a clear understanding of the shape to be given to such cam-tracks is afforded by the drawings, particularly Fig. 3.

Turning now to the means by which a drop of solder is deposited upon and affixed to each can-top as its support is brought to position B, 59 indicates a frame securely affixed at its lower end to the main frame 20 and, as clearly indicated in Fig. 1, forked or bifurcated at its upper end. 60 indicates two forwardly-projecting bars pivoted at 61 to the upper ends of the yoke portion of the frame 59, and 62 indicates another pair of corresponding bars pivoted at 63 a short distance below the first-mentioned pair of parallel bars 60. The upper and lower bars of the two pairs 60 and 62 are connected, respectively, by rearwardly-curved connecting-pieces 64, the connections of these pieces 64 with the bars being pivotal connections, (indicated by 65 and 66.) The forward ends of the upper and lower bars 60 and 62 are further connected by vertical pieces 67, the connections of the bars with the pieces 64 and 67 being pivotal connections, as indicated at 65 and 66. The parts 60, 62, 64, and 67 form a movable frame upon which are supported the devices for moving the strips of solder employed and also the irons for melting off single drops of solder from time to time from these solder-strips.

68 indicates two irons having their lower ends tapered, as shown. These irons are mounted in clamps 69, that are carried on the inner faces of the forward connecting-pieces 67. (See Fig. 1.) The irons are adapted to be kept heated by an electric current transmitted through wires 70.

71 indicates strips of solder which lead from loosely-mounted reels, such as 72, (see Fig. 3,) and are each directed downward between grooved pulleys 73 into a tubular guide 74, that ends in close proximity to the lower ends of the heated irons 68, so that as the solder projects through the tubular guide the iron adjacent thereto when moved downward will come in contact therewith and melt off a small portion, which will be dropped upon a can-top that is on the uppermost one of the can-top supports 31. The pulleys 73 are suitably journaled in the curved connections 64.

As the movable frame comprising the parallel bars 60 and 62 is reciprocated up and down, as hereinafter described, the feeding of the solder-strips between the grooved pulleys 73 is caused by means of a pawl-and-ratchet device. The ratchet is indicated by 75 and is fast on the shaft that carries the lowermost set of pulleys 73. The pawl is indicated by 76, said pawl being pivoted at 77 to a short arm 78, that in turn is pivotally attached to one side of a sleeve 79, that is located upon a rod 80, extending in a diagonal direction forwardly and downwardly from the rear pivotal connection 61. The short arm 78, connected to the sleeve 79, is, as shown, pivotally attached to the shaft on which the lowermost pair of pulleys 73 is mounted. 81 82 indicate two stops affixed to the rod 80, a stop being located a short distance from each of the ends of the sleeve 79.

83 indicates a flat spring secured at its lower end to a projection 84, extending forwardly from the arm 78 near the lower end of such arm and bearing at its free end against the pawl 76, so as to keep such pawl normally in engagement with the ratchet-wheel 75.

It is evident that by reason of the parallel-bar construction described the irons 68 at the forward ends of such parallel bars will be moved vertically. The movement of the frame comprising the parallel bars is accomplished by means of vertical bars 85, that are pivoted to rods extending across the upper and lower sets of parallel bars 60 and 62, said bars 85 being pivotally connected at their lower ends to a short bar 86, which in turn is connected at its lower end to a pin that is engaged by a cam 87, fast on the main shaft 22.

88 indicates a bar pivoted to the frame 59 and projecting forward between the upright actuating-bars 85, to which it is also pivotally connected, as shown at 89. The forward end of this bar 88 is provided with a cross-strip 90, which carries at each end a block 90$^a$. The cross-strip 90 is arranged so that the two blocks 90$^a$ are directly over the two can-top supports, and the downward movement of the upright actuating-bars 85 will bring down one of the blocks 90$^a$ upon the can-top on each of the supports when in the position C. (Shown in Fig. 3.) As shown in that figure, the blocks 90$^a$ are adjustable up and down by means of suitable set-screws, so that the blocks 90$^a$ can be arranged to hold in place temporarily large can-tops which rest in the largest and shallowest annular depressions (see Fig. 5) or to so hold smaller can-tops which rest in the smaller and deeper annular depressions. It is when the can-tops are thus momentarily held in place at C that the blast of air is forced through the vent-holes, as heretofore stated. As will be seen from Fig. 3, these blocks 90$^a$ are grooved on the bottom, so as not to interfere with the passage of the air through the vent-holes, which are directly under said blocks. It is evident also that the movement of these actuating-rods 85 will cause the parallel bars 60 and 62 to be reciprocated, and at each downward movement of such bars the stop 82 on the rod 80 will come in contact with the adjacent end of the sleeve 79, and thereby swing the short arm 78 on the support to which its upper end is pivoted. The effect of this movement will be through the pawl 76 to turn the ratchet-wheel 75, thereby turning in a forward direction the lowermost pair of grooved pulleys 73, which, gripping upon the strips of solder 71, will, in connection with the upper pair of coöperating pulleys, move such strips slightly forward, so as to cause them to project at the lower ends of the tubular guides 74. On the upward movement of the parallel bars the collar 81 will come in contact with the sleeve and the arm 78 be turned to cause the pawl to engage another tooth of the ratchet-wheel. A light coiled spring 78$^a$ is secured to one of the upper bars 60 and at its other end to the lower end of the short arm 78, thereby insuring such arm being held in proper position at all times with respect to the ratchet-wheel 75.

91 indicates two receptacles for containing flux which is adapted to drip therefrom through flexible tubes 92, such tubes being so adjusted that the flux will properly drop upon the can-top in connection with the solder, so that such solder will adhere thereto. These receptacles 91 in the construction shown are affixed to the outer faces of the front bars 67 by means of connections 93, attached to the lower ends of the receptacles 91 and affixed at their ends to the bars 67.

Referring now to the means for forcing the blast of air through the vent-holes after the drops of solder have been affixed to such can-tops and when the supports have reached the position indicated by C, (see Fig. 3,) it will be remembered that the ultimate object of the machine is to affix to a can-top a drop of solder in proximity to the vent-hole. This solder should be deposited in such a position that it can in a subsequent operation be very readily spread over the vent-hole to close it, and with that in view it is desirable to place it as close as possible without actually closing the vent-hole. It is customary, moreover, to use a can-top having a central circular depression with the vent-hole in the middle of the depression and to deposit the drop of solder on the sloping side of such depression, although it is of course not necessary to use such a can-top as this just described In any event when the drop of fused solder is placed near the vent-hole it sometimes happens that such solder spreads out and closes the vent-hole. To prevent the solder from completely hardening in such position, I have provided that a blast of air shall be forced through the vent-hole in the can-top on the support at position C before the solder has completely hardened, thus removing such partially-hardened solder from the vent-hole and insuring that it shall remain open. It will be understood, of course, that other means than a blast of air might be used for this purpose of preventing the solder from setting in the vent-holes, the essential point being that the solder shall not in this manner close the vent-hole.

94 indicates an air-pipe suitably connected to a receptacle containing compressed air. (Not shown.) This pipe in the construction shown leads up along one side of the main frame of the machine and has its upper end turned inwardly, as shown in Fig. 1, such turned upper end passing through and being suitably supported in a casting 95, carried by the main frame. 96 indicates a tubular connection of considerably larger interior diameter than the pipe 94 and fitting over and upon the projecting end of such pipe. This connection is provided with a discharge-orifice 97 at its forward end. Coiled around the forward end of the pipe 94 is a spring 98, bearing at one end against a ring 99, formed on the inner face of the connection 96, and at its rear end against a similar ring 100, formed upon the outer face of the pipe 94. The effect of the spring is to keep the said connection projected forward, it being limited in its forward movement by an annular stop 101, formed on it, which stop comes in contact with the ring 100. It is also limited against projecting too far by slots 102, formed in the connection, into which project pins 103, projecting from the face of the pipe 94. These slots and pins act, further, to prevent any rotation of the connection upon said pipe 94. The air-blast passing through the pipe 94 is at stated intervals cut off by means of a valve 104, working in a suitable casing attached to the main frame of the machine, the movement of the valve being controlled by a cam 105, fast on the main shaft 22. (See Fig. 10.) The connection 96, it will be noticed, is normally held projected, so as to lie slightly in the path of rotation of the various hollow shafts 29, upon which are mounted the can-top supports 31. As each of these shafts approaches the position indicated by C, which, as before explained, is the position that they assume immediately after having had the drop of solder applied to the can-tops that they carry, it will come in contact with the projecting end of the connection 96, and, as the end of such connection is beveled, as best seen in Fig. 12, the connection will be forced back against the action of its coiled spring 98, and as the opening 97 in such connection comes opposite the open end of the shaft the cam 105 will move to open the valve 104, thus permitting a blast of air to be forced through the pipe 94 and through such hollow shaft. Such blast of air will pass up through the passage 32 in the studs 30 of the can-top supports and will pass out through the vent-holes, as above described. The bar 88 and blocks 90ª are then raised, as will be clearly understood, and upon further rotation of the carrier the can-tops fall off the supports into any suitable receptacle. It will be understood that as the rotation of the carrier continues the hollow shaft that has just had a blast of air blown through it will pass out of contact with the connection, and as this takes place the cam 105 will act to move the valve to shut off the passage of air in the main pipe, and such valve will remain closed until the next succeeding hollow shaft moves around and contacts and moves the connection, as just explained.

By my invention I provide a machine by which can-tops of various sizes can have applied to them a single drop of solder and have such solder applied uniformly with respect to its location relative to the vent-hole that is formed therein, so that such drop of solder, after the can to which the top is applied has been filled and subjected to a processing operation, can be readily and easily utilized for closing such vent-hole, thereby effecting a very considerable saving in solder over the method heretofore employed. While I have shown my machine as adapted for operating simultaneously upon two can-tops, it is evident that without departing from my invention a machine may be constructed to operate upon a single can-top at a time or upon more than two can-tops.

What I claim as my invention, and desire to secure by Letters Patent, is—

1. The combination with a carrier adapted to receive can-tops and discharge the same from the carrier, of means for affixing drops of solder to the can-tops adjacent to vent-holes therein, and means for forcing the solder out of said vent-holes before the solder sets, substantially as described.

2. The combination with a carrier adapted to receive can-tops and discharge the same from the carrier, of means for affixing drops of solder to the can-tops adjacent to vent-holes therein, and means for forcing a current of air through said vent-holes before the solder sets, substantially as described.

3. The combination with a carrier adapted to receive can-tops and discharge the same from the carrier, of means for affixing drops of solder to the can-tops adjacent to vent-holes therein, and means mounted on said carrier adapted to automatically open the vent-holes in the can-tops before the solder sets, substantially as described.

4. The combination with a carrier adapted to receive can-tops and discharge the same from the carrier, of means for affixing drops of solder to the can-tops adjacent to vent-holes therein, and means mounted on said carrier and adapted to force a blast of air through said vent-holes before the solder sets, substantially as described.

5. The combination with a series of can-top supports and means for rotating them around a horizontal axis, of means for intermittently stopping their rotation, means for affixing during such stoppage a drop of solder to a can-top held on one of such supports, and other means for preventing such drop of solder from closing a vent-hole in such can-top, substantially as described.

6. The combination with a series of can-top supports and means for rotating them around a horizontal axis, of means for intermittently stopping their rotation, means for affixing during such stoppage a drop of solder to a can-top held on one of such supports, and means for forcing a blast of air through a vent-hole in the can-top before the solder hardens to prevent such solder from closing the vent-hole, substantially as described.

7. The combination with a series of can-top supports and means for rotating them around a horizontal axis, of means for intermittently stopping their rotation, means for affixing during such stoppage a drop of solder to a can-top held on one of such supports, and means for forcing a blast of air through a vent-hole in a second can-top on another of said supports to prevent a drop of solder previously deposited on such can-top from closing the vent-hole, substantially as described.

8. The combination with a series of can-top supports and means for rotating them around a horizontal axis, of means for intermittently stopping their rotation, means for bringing and holding three of said supports to a substantially horizontal position with the intermediate one of said three supports elevated above the other two, means for automatically applying a drop of solder to a can-top carried by said intermediate support, and other means for preventing a drop of solder previously affixed to a can-top carried by one of the other horizontally-held supports from closing a vent-hole in said last-named can-top, substantially as described.

9. The combination with a rotatable carrier comprising two wheels set a distance apart and a series of shafts connecting the said wheels, of means for intermittently stopping the rotation of the carrier, a can-top support mounted between the wheels on each of said shafts, means for independently rotating the shafts to bring one of the said supports to a substantially horizontal position when the rotation of the carrier is stopped, and means for depositing a drop of solder on a can-top carried by said horizontally-disposed support, substantially as described.

10. The combination with a rotatable carrier comprising two wheels set a distance apart and a series of shafts carried by said wheels, of means for intermittently stopping the rotation of the carrier, a can-top support mounted on each of said shafts, means for independently rotating the shafts to bring one of the said supports to a substantially horizontal position when the rotation of the carrier is stopped, means for depositing a drop of solder on a can-top carried by said horizontally-disposed support, and other means for preventing a drop of solder previously affixed to a can-top carried by another of said supports from closing a vent-hole in said last-named can-top, substantially as described.

11. The combination with a rotatable carrier comprising two wheels set a distance apart and a series of shafts carried by said wheels, of means for intermittently stopping the rotation of said carrier, a can-top support mounted on each of said shafts, means for independently rotating the shafts to bring a plurality of said supports to a substantially horizontal position when the rotation of the carrier is stopped, means for depositing a drop of solder on a can-top carried by one of said horizontally-disposed supports, and other means for preventing a drop of solder previously affixed to a can-top carried by another of said horizontally-disposed supports from closing a vent-hole in said last-named can-top, substantially as described.

12. The combination with a rotatable carrier comprising two wheels set a distance apart and a series of shafts carried by said wheels, of means for intermittently stopping the rotation of said carrier, a can-top support mounted on each of said shafts, an arm on one end of each shaft, a cam with which said arm engages to cause an independent rotation of the shaft so as to bring the support on the shaft to a substantially horizontal position, and means for depositing a drop of solder on a can-top carried by such horizontally-disposed support, substantially as described.

13. The combination with a rotatable carrier comprising two wheels set a distance apart and a series of hollow shafts carried by said wheels, of means for intermittently stopping the rotation of the carrier, a can-top support mounted on each shaft and having a passage communicating with the interior of the shaft, and means for automatically connecting one of said hollow shafts with an air-blast device during the stoppage of the carrier, substantially as described.

14. The combination with a movable carrier comprising a hollow shaft, of a can-top support mounted on said shaft and having a passage communicating with the interior of the shaft, means operated by the movement of the shaft for connecting it with an air-blast pipe and means for holding a can-top on said support when air is forced through said shaft, substantially as described.

15. The combination with a movable carrier comprising a hollow shaft, of a can-top support mounted on said shaft and having a passage communicating with the interior of the shaft, means for automatically connecting and disconnecting it with an air-blast pipe and means for holding a can-top on said support when air is forced through said shaft, substantially as described.

16. The combination with a movable carrier comprising a hollow shaft, of a can-top support mounted on said shaft and having a passage communicating with the interior of the shaft, an air-blast pipe, and a connection on the end of said pipe adapted to be moved by said shaft to connect said shaft and pipe, substantially as described.

17. The combination with a movable carrier comprising a hollow shaft, of a can-top support mounted on said shaft and having a passage communicating with the interior of the shaft, an air-blast pipe, and a spring-actuated sliding connection on the end of said pipe adapted to be moved by said shaft to connect said shaft and pipe, substantially as described.

18. The combination with a movable carrier comprising a hollow shaft, of a can-top support mounted on said shaft and having a passage communicating with the interior of the shaft, an air-blast pipe, a movable connection between said pipe and shaft, a valve in said pipe, and means for opening said valve when said pipe and shaft are joined by said connection, substantially as described.

19. The combination with a can-top support, of means for applying material to a can-top held thereon, and other means for thereafter forcing a blast of air through a vent-hole in said can-top to prevent said material from closing said vent-hole, substantially as described.

20. The combination with a can-top support, of means for applying material to a can-top held thereon, means for moving said support, and other means for forcing a blast of air through a vent-hole in said can-top to prevent said material from closing said vent-hole, substantially as described.

21. The combination with a can-top support, of means for applying material to a can-top held thereon, means for moving said support, other means for forcing a blast of air through a vent-hole in said can-top to prevent said material from closing said vent-hole, and a device for preventing such can-top from being forced by the blast of air out of contact with said support, substantially as described.

22. The combination with a can-top support, of means for applying material to a can-top held thereon, means for moving said support, other means for forcing a blast of air through a vent-hole in said can-top to prevent said material from closing said vent-hole, a device for preventing such can-top from being forced by the blast of air out of contact with said support, and cam-actuated means for turning said support to discharge such can-top, substantially as described.

23. The combination with a rotatable carrier mounted on a horizontal shaft, of a disk and a ratchet-wheel secured to said shaft, an arm pivoted on said shaft adjacent to said disk and wheel, a pawl on said arm adapted to engage said ratchet-wheel, a lever engaging said disk and acting to normally hold it and the shaft on which it is mounted against rotation, a device carried by said pivoted arm for bearing against said lever to release it from engagement with said disk, and means for rocking said arm, substantially as described.

24. The combination with a solder-iron, of a frame for supporting said solder-iron, such frame comprising two pivoted parallel bars, a connection between said parallel bars, pulleys journaled in said connection and adapted to grip a strip of solder, and means for rotating said pulleys to feed said strip toward the solder-iron, substantially as described.

HOLTON EACHUS.

Witnesses:
C. E. PICKARD,
W. H. DE BUSK.